United States Patent [19]

Ogden et al.

[11] E Re. 28,915

[45] Reissued July 20, 1976

[54] DETECTION OF PRODUCTS OF COMBUSTION

[75] Inventors: Wilbur L. Ogden, Aurora; Clarence Glenn Henderson, Ottawa, both of Ill.

[73] Assignee: BRK Shareholders' Committee

[22] Filed: July 13, 1973

[21] Appl. No.: 378,997

Related U.S. Patent Documents

Reissue of:

[64] Patent No.: 3,594,751
Issued: July 20, 1971
Appl. No.: 709,415
Filed: Feb. 29, 1968

[52] U.S. Cl. ..... 340/237 S; 340/228 R; 340/249

[51] Int. Cl.[2] ..... G08B 17/10

[58] Field of Search ..... 340/228, 237 S, 213 R, 340/333, 249; 307/64–68, 23, 28, 18; 250/381; 315/86, 87

[56] References Cited

UNITED STATES PATENTS

| | | | |
|---|---|---|---|
| 1,990,659 | 2/1935 | Lindsey | 340/227.1 |
| 2,408,051 | 9/1946 | Donelian | 340/237 S |
| 2,870,434 | 1/1959 | Schulze | 340/227.1 |
| 2,880,390 | 3/1959 | Calvert | 340/220 X |
| 3,150,359 | 9/1964 | Hoey | 340/213 R |
| 3,155,951 | 11/1964 | Duenke | 340/214 |
| 3,189,788 | 6/1965 | Cady | 340/248 X |
| 3,235,857 | 2/1966 | Bagno | 340/258 L X |
| 3,245,067 | 4/1966 | Blevins | 340/228 |
| 3,255,441 | 6/1966 | Goodwin et al. | 340/228 X |
| 3,349,386 | 10/1967 | Zug | 340/249 |
| 3,409,885 | 11/1968 | Hall | 340/237 UX |
| 3,422,337 | 1/1969 | Carson | 320/48 |

*Primary Examiner*—John W. Caldwell
*Assistant Examiner*—Daniel Myer
*Attorney, Agent, or Firm*—Mason, Kolehmainen, Rathburn & Wyss

[57] ABSTRACT

A self-contained, self-powered, early warning fire detector and alarm of small size and attractive appearance especially adapted for use in residences; the detector including readily accessible sensitivity control and operability test means, and having a standby power source which additionally serves to monitor the primary power source and inform occupants of malfunction of the primary power source.

40 Claims, 6 Drawing Figures

Inventors:
Wilbur L. Ogden
Clarence Glenn Henderson
By Gary, Parker,
Juettner, Pigott & Cullinan
Atty's Fig. 3.
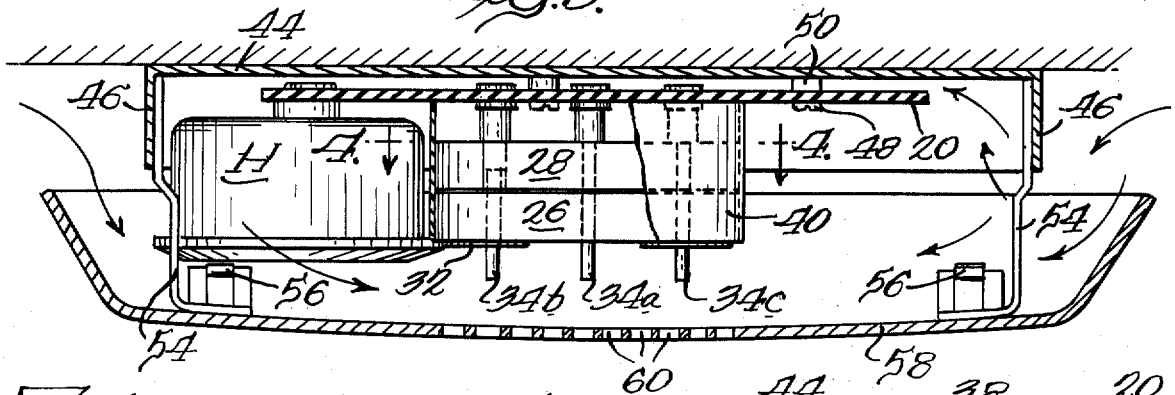
Fig. 4.
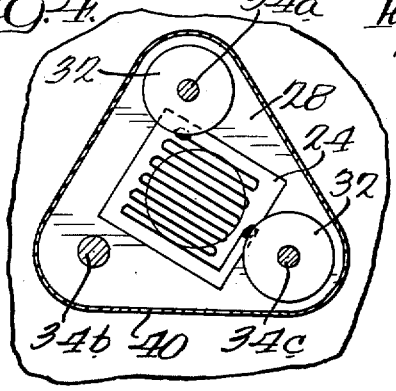
Fig. 5.
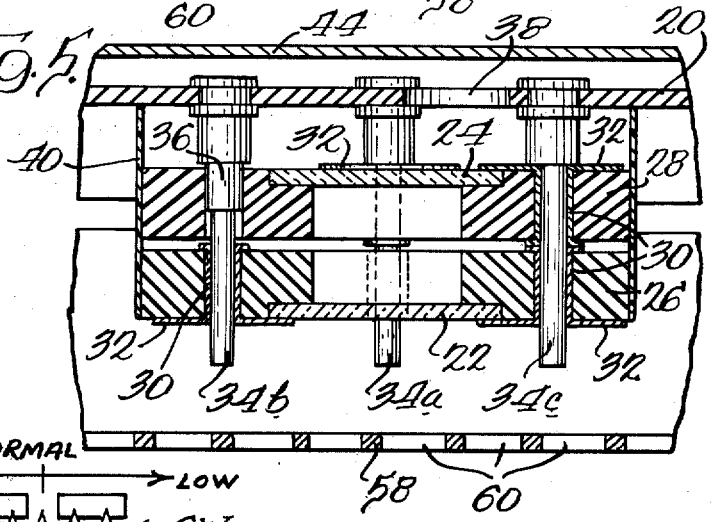
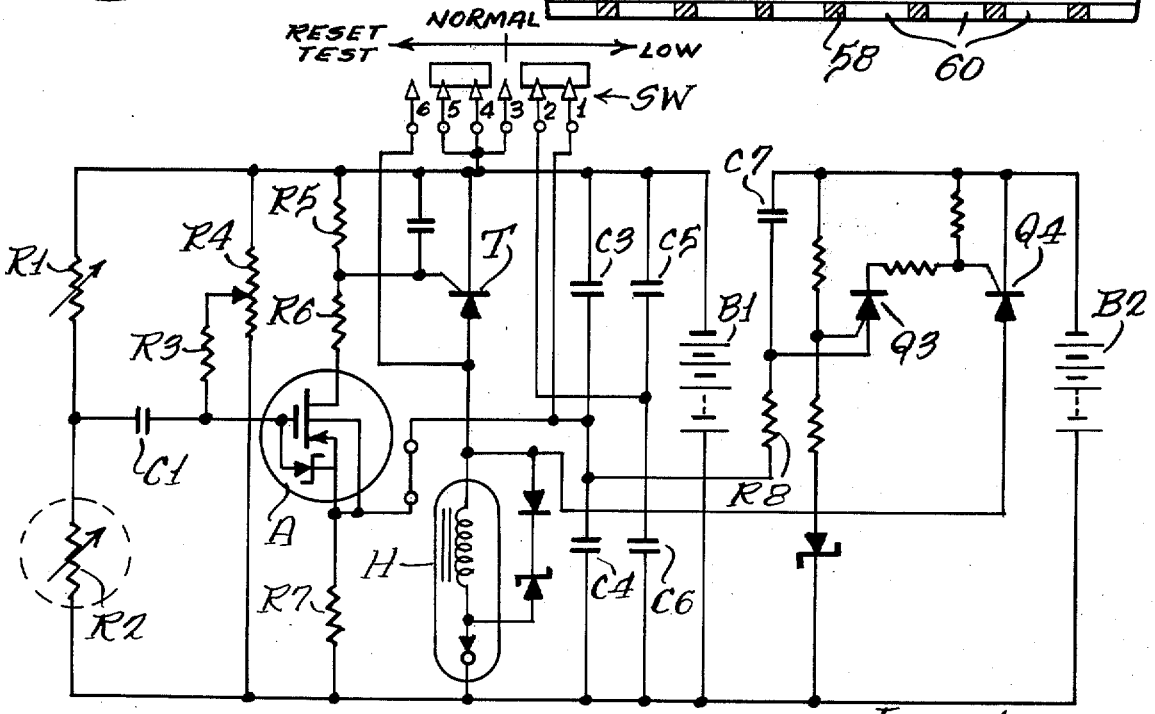
Fig. 6.
Inventors:
Wilbur L. Ogden
By Clarence Glenn Henderson
Gary, Parker,
Juettner, Pigott & Cullinan
Attys

DETECTION OF PRODUCTS OF COMBUSTION

Matter enclosed in heavy brackets [ ] appears in the original patent but forms no part of this reissue specification; matter printed in italics indicates the additions made by reissue.

BACKGROUND OF INVENTION

This invention is closely related to and constitutes an improvement upon U.S. Pat. No. 3,245,067, which describes and claims an early warning fire detector characterized by a pair of impedance means or resistance grids sensitive to the increase in electrical conductivity of the air upon initiation of a fire, the grids being connected in a bridge circuit and comprising a first grid freely exposed to the atmosphere and a second grid accommodating only slow or delayed access thereto of the atmosphere, whereby to provide a rate-of-change device that senses the fast change in the electrical conductivity of the atmosphere that occurs even in the incipient stages of fire, as well as in the smoke, flame and heat stages of fire. The second grid compensates the first or detector grid against slowly occurring changes, such as atmospheric changes and those due to one or more people smoking in the room, but does not respond with sufficient rapidity to the fast change caused by a fire, with the result that the bridge becomes unbalanced and a signal is transmitted via an suitable to suiable alarm means.

The grids each comprise a substrate of known surface resistivity and an electrode configuration in the form of two opposing and interfitting comblike electrodes on the substrate, one comprising the positive plate and the other the negative. Power is supplied to the positive plate of one grid and the negative of the other; the negative of the one grid and the positive of the other being connected and the junction constituting the output of a bridge which is coupled to the amplifier and the alarm or other suitable control devices.

SUMMARY OF IMPROVEMENTS

This invention utilizes the same basic structure and mode of operation as that of said patent, and attains the same results but in a more efficient, economical and facile manner.

In the first instance, this invention provides an entirely self-contained, self-powered and self-alarming device requiring no external wiring, no control panels, no alarm panels, and no human supervision.

Secondly, it is housed in an extremely compact and attractive package especially designed for use in homes, apartments and small proprietorships which heretofore have not had available to them early warning fire detection and alarm, except at exorbitant cost.

Third, the unit is constructed in such manner that the same can readily be installed and serviced by any individual homeowner, the unit being installed by screwing two screws into the ceiling and being serviced essentially solely by timely replacement of batteries.

Fourth, the physical construction of the device and its housing are such as to afford extremely prompt and efficient response to the presence of products of combustion.

Fifth, the unit embodies a primary battery and a standby or replacement battery, and circuit means causing the standby battery to continually monitor the strength or the primary battery and to give a supervisory warning to the homeowner when the strength of the primary battery falls below a predetermined but safe value, whereby the homeowner is warned to replace the primary battery with the standby battery and to secure in reasonable time a fresh replacement for the standby battery.

Sixth, the circuitry of the detector includes means for varying the sensitivity of the device, thereby to adjust the device from a highly sensitive setting when the family is home alone to a relatively reduced sensitivity preventing false alarming when the family is entertaining and the house is filled with guests who may be smoking.

The circuitry also includes means facilitating resetting of the detector following an alarm, and for testing the reliability of the detector and its primary battery whenever desired.

Preferably, the sensitivity control and the test-reset circuits are connected to a single multiple position switch readily accessible to the homeowner to facilitate performance by him of the described functions.

Other improvements reside in various electrical and structural details which will become obvious in the following detailed description.

THE DRAWINGS

FIG. 3 is a vertical section taken substantially on line 3—3 of FIG. 2;

FIG. 4 is a top plan view of the detector grid assembly, the view being taken substantially on line 4—4 of FIG. 3;

FIG. 5 is an enlarged cross-sectional view of the detector grids and grid mounting provided by this invention, the view being taken substantially on line 5—5 of FIG. 2; and FIG. 6 is a schematic diagram of the electrical circuit of the detector.

DETAILED DESCRIPTION

Figure 1:
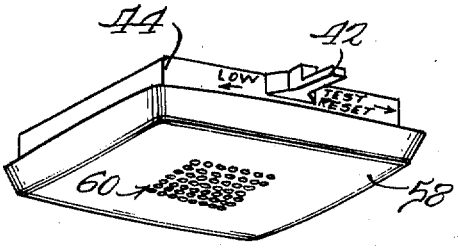
FIG. 1 is a perspective view of our detector as it would appear mounted on the ceiling of a room.

Referring first to the electrical circuitry, FIG. 6, the device is comprised of sensing means, an amplifier, an alarm circuit, a primary power supply, a supervisory circuit including a secondary power supply, a sensitivity adjustment, and a reset-test circuit.

Sensor

The sensing means of the detector comprises an impedance bridge made up of two impedance or resistance grids R1 and R2 mounted in such manner that one grid R1 (called the detector) is open to the atmosphere, and the other grid R2 (called the compensator) is relatively closed to the atmosphere—resulting in a rate-of-change device that senses fast changes caused by combustion, but ignores relatively slow changes such as atmospheric variations or changes due to an individual smoking in the room.

When the detector senses the occurrence of combustion, in the form of invisible and/or visible combustion gases, its resistance is lowered by the combustion products impinging on the surface of grid R1. This unbalances the bridge, causing a signal to be passed through coupling capacitor C1 to the amplifier A.

Amplifier

The amplifier A is made up of a single stage metal oxide silicon enhancement mode field effect transistor or MOSFET. This transistor matches the high impedance of the sensor bridge to the low impedance of the trigger circuit.

The MOSFET is adjustably biased by potentiometer R4 through resistor R3, until the drain current through resistor R6 reaches a desired sensitivity setting. When the detector resistance decreases due to combustion products, current through R6 increases until the voltage drop developed across resistor R5 is sufficient to turn on a trigger device T, which is preferably a silicon controlled rectifier. Resistor R7 in the MOSFET source normally limits the bias current to a value less than that required to trigger the SCR.

Alarm Circuit

When the SCR triggers into the "on" condition, current flows through the horn H from battery B1, thereby sounding an alarm.

Power Supply

Power is supplied by a 10.7 volt mercury battery B1, which provides the small bias current to operate the sensors and the amplifier, and also provides the current necessary to drive the horn in the event of an alarm.

Supervisory Circuit

When the current of battery B1 begins to fall off at the end of battery life, the voltage drop across R7 is decreased. When this voltage drop reaches a predetermined level, at which the bucking voltage of battery B1 is overcome by battery B2, capacitor C7 charges through resistor R8 to the point where a PUT or programmable unijunction transistor Q3 switches on, in turn triggering an SCR Q4. When Q4 is triggered on, it connects the battery B2 to the horn H and thereby sounds an alarm. SCR Q4 can only remain switched on as long as gate current is supplied from the PUT Q3. Q3 remains on until capacitor C7 discharges through the PUT anode, whereupon Q3 shuts off, causing Q4 to shut off, and the horn to stop sounding. At this point, C7 again begins to charge through resistor R8 from battery B2, and after an elapsed time of approximately 5 minutes, the cycle is repeated. The duration of each horn blast is 1 to 2 seconds. Because very little current is drawn from the supervisory battery B2 (except during the short horn blasts), this circuit will continue to sound the described trouble alarm for approximately 600 hours.

During normal operation, there is no drain on the supervisory battery, therefore, this battery will last its shelf life, which at present time is 2 years. The small current drawn from the primary supply during normal operations results in a battery life of at least one year—providing the unit is not in alarm condition for any great period of time during this year. At the end of one year, or sooner if the primary battery has been alarmed often, the primary battery B1 should be removed and the supervisory battery B2 put into the primary battery position. A new battery should be installed as promptly as reasonably possible into the supervisory position, or supervision will be lost.

In any event, the supervisory circuit R8, C7, Q3, Q4 and B2 (assuming a battery is in position in the supervisory circuit) will always inform the homeowner or proprietor of the fact that the primary battery is due to be replaced whenever its output falls below that required to produce the predetermined voltage drop across R7. Under normal conditions, one battery is replaced per year and practically no other maintenance is required of the homeowner.

Sensitivity Control

The potentiometer R4 provides a basic sensitivity adjustment for the detector from the standpoint of factory and/or factory-authorized adjustment, but it is generally not advisable to recommend setting of the potentiometer by an unskilled individual. However, it is desirable to provide the homeowner with some degree of control over the sensitivity of the detector due to the wide divergence of atmospheric conditions existing in the home when occupied solely by members of the family and the conditions that exist when a number of guests are present in the home. A setting of optimum sensitivity for the family could result in vexatious false-alarming of the detector when a number of guests are present.

To accommodate sensitivity adjustment, the circuit is provided with two banks of capacitors, i.e., a first bank comprised of capacitors C3 and C4 and a second bank comprised of capacitors C5 and C6, both having center taps adapted to be coupled to the source of the amplifier A, and switch means SW including contacts 1 and 2 accommodating connection of the first bank only to the amplifier to afford a relatively low sensitivity and connection of both banks to the amplifier to afford a relatively high sensitivity (the switch position shown in FIG. 6). The switch is made conveniently accessible to the homeowner to facilitate selection of high sensitivity or low sensitivity as desired.

Test-Reset Circuit

The trigger device T and its connections in the circuit are such that once triggered it will remain triggered until reset. To accomplish resetting, switch SW is provided with contacts 5 and 6 which when closed will cause the trigger device to be bypassed, the load thereon relieved and the device thereby to be reset to nonconducting or "off" condition, whereupon the alarm is turned off until the rate-of-change of ambient conditions is again such (or remains such) that the device is again triggered.

By connecting the bypass through switch contacts 5 and 6 in such manner that the primary power source B1 becomes directly closed upon the horn H, the switch will simultaneously provide the homeowner a convenient means for manually checking the operability of the device and the condition of the battery, that is, he may manually sound the alarm and check the detector without having to trigger the device by starting a fire, burning a match or blowing smoke on the unit, although all of these others are further alternatives for testing the operability of the detector.

Structure

Figure 2:
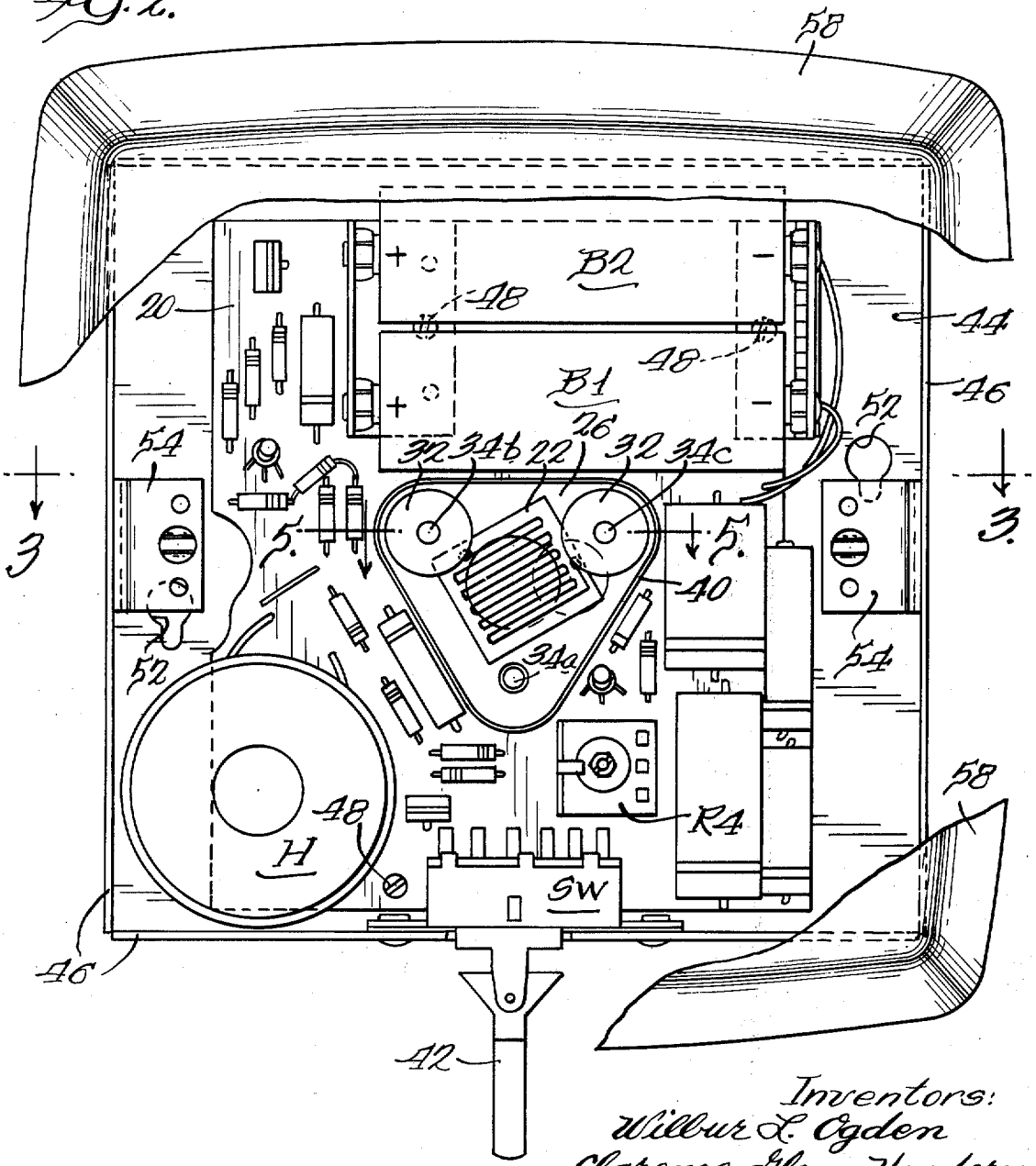
FIG. 2 is an enlarged bottom plan view of the detector, with the cover thereof broken away to reveal the physical components and their assembly.

The components of the detector are transistorized and miniaturized to the extends presently feasible, physically and economically, and all are arranged compactly on a circuit board 20 as shown in FIGS. 2 and 3. The upper surface of the board comprises a printed circuit providing the electrical connections between the components, and the components themselves are mounted on the lower surface of the board; the horn H, the potentiometer R4, the switch SW and the batteries B1 and B2 being identified for sake of reference.

The grids R1 and R2 of FIG. 6 are formed on glass substrates 22 and 24, respectively, each being mounted in a ceramic holder 26, 28 of generally triangular form. Each holder has three holes therethrough, adjacent its corners, two of which are provided with conductive grommets 30 and washers 32 which serve to secure the substrates in the holders and to effect electrical connection with the "comblike" grid pattern on the substrate.

The substrates are preferably thin square pieces of high purity modified boro-silicate glass and the grid patterns are preferably tin oxide applied to the substrates in accord with known tin oxide technology, the two washers 32 of each assembly physically and electrically contacting the respective portions of the grid pattern.

Depending from the circuit board 20 are three shouldered pins 34a, 34b and 34c, one of which (the pin 34c at the right in FIG. 5) comprises the center junction of the impedance bridge, and the other two of which comprise the power leads to the bridge. Pin 34b includes a second shoulder or boss 36 whereby the upper grid can be mounted on the pins solely with its free or ungrommeted hole aligned with the boss 36, whereby the two grommeted holes are properly connected with the respective electric circuit elements, the two grommets firmly engaging the respective pins 34a and 34c to establish the necessary electrical connection. The bottom grid may then readily be slipped on the pins with one grommet on the center junction pin 34c and the other grommet on the pin 34b having the second shoulder 36.

The lower substrate 22 carries the detector R1 and the same is mounted with the grid bearing surface thereof facing downwardly and freely exposed. The upper substrate 24 carries the compensator grid R2 and it is mounted with the grid bearing surface thereof facing upwardly and having access to the atmosphere solely through a hole 38 in the circuit board 20, whereby the grid R2 is shielded and effectively responsive only to slowly occurring ambient change and not to rapid ambient change. The shoulders on the pin 34 serve to space the grid R2 from the circuit board and in order to form an enclosed compensating chamber about the grid (except for the opening 38) a sheet or tube 40 of flexible tape is slipped over the peripheral surfaces of the holders 26, 28 and into engagement with the lower surface of the circuit board.

The tape 40 and the two grids may conveniently be slipped off to facilitate cleaning of the grids, which should be done periodically to insure the proper balance of the bridge.

The switch SW may take a variety of forms, and could in fact constitute several swiches. However, we have found it convenient to utilize a double pole, triple throw switch having a central position (which we employ for high sensitivity), a first settable end position (which we use for low sensitivity) and an opposite end position having automatic spring return (which we utilize for the test-reset position—the switch thereby automatically returning to the high sensitivity position after reset or test). This switch is preferably equipped with a relatively long handle 42 for a purpose to be described.

Housing

The components of the detector are all assembled on the circuit board in a single layer (except for the stacking of the two grids) and the same are selected of the minimum practical and feasible height whereby to provide a working assembly of extremely low profile.

The entire assembly is then mounted in a shallow inverted rectangular or square sheet metal pan 44 having short depending sidewalls 46. The mounting is preferably effected by passing three or four sheet metal screws 48 through the circuit board and some suitable spacers 50 and threading the same into the pan, whereby to mount the board in the pan but in spaced relation to the surfaces thereof. For the sake of rigidity of mounting, it is also preferable to bolt or otherwise secure the switch SW to one sidewall 46 of the pan.

The pan in turn is adapted to be mounted on the ceiling of a room, or the top wall of an enclosure or duct, by a pair of screws extending through appropriate holes 52 in the top wall of the pan. Preferably, the holes are of keyhole shape to facilitate detachable mounting of the pan in the ceiling.

Depending downwardly from opposite sidewalls 46 of the pan, to a level below all of the detector components, are a pair of brackets 54 which are adapted for the detachable reception of a pair of pins 56 extending upwardly from the inner surface of a cover 58 for the detector. The cover is an integral member formed of metal or a suitable plastic and having an attractive configuration and exterior surface (i.e., lower and outer side surfaces). The cover is essentially of pan shape and larger than the pan 44 so that its upstanding sidewalls are spaced outwardly from the depending sidewalls 46 of the pan. The sidewalls of the cover extend upwardly to a level somewhat below the level of the upper surface of the pan so that they are spaced from the ceiling when the device is installed, and preferably terminate slightly above the lower edge of the sidewalls 46 so as to conceal the components of the detector. Centrally of the lower wall thereof, the cover 58 is provided with a plurality of small, closely spaced perforations 60 aligned generally with the grid R1 of the lower substrate 22.

Products of combustion inherently rise to the ceiling and then spread horizontally along the ceiling. According to the present invention, the spacing of the sidewalls of the cover from the ceiling and the pan and the perforation 60 together provide a path for highly effective and efficient circulation through the housing and over the detector grid of the products of combustion irrespective of the direction of circulation of such products. Products of combustion from a fire occurring below the detector will rise upwardly through the perforations 60 and spread laterally outward through the spaces between the pan and the cover and the ceiling, whereby to assure prompt and thorough exposure of the detector grid to such products. In the event of a fire remotely of the detector, the products will rise to the ceiling and spread horizontally along the ceiling, whereupon the spaces between the cover and ceiling, coupled with the low profile of the detector components, will act to more or less "scoop" the products slightly downwardly and over the detector grid, whereby again to assure prompt and thorough exposure of the grid to such products.

In a practical commercial embodiment, the detector with all of its advantages and special features is only 7 inches square and 1¾ inches deep. In this model, the handle 42 of the switch protrudes slightly outwardly beyond the sidewalls of the cover to facilitate operation by a broom handle or the like so that the householder need not climb on a ladder or a chair to set the sensitivity or test the operability of the unit.

Thus, the invention provides a totally self-contained and early warning fire detector of low profile and attractive appearance that may be mounted on the ceiling in a private home and which, when so installed, provides for extremely fast and efficient exposure of the detector grid to the products of combustion and immediate warning of the presence of fire.

While we have shown and described what we regard to be the preferred embodiment of our invention, it is to be appreciated that various changes, rearrangements and modifications may be made therein without departing from the scope of the invention as defined by the appended claims.

We claim:

1. In a warning device having a primary power source, an alarm unit connected to said source and a load unit connected to said source; a supervisory circuit comprising a secondary power source, a capacitor in series with said secondary source, means coupling said capacitor to one side and said secondary source to the other side of said load unit to sense the voltage drop thereacross, trigger means responsive upon charging of said capacitor for connecting said alarm unit with said secondary source, said capacitor being charged by said second source when the voltage drop across said load unit falls below a predetermined value and when charged triggering said trigger means, said trigger means during discharge of said capacitor causing said secondary source to energize said alarm unit [ whereby the alarm unit,] whereby the alarm unit emits periodic alarms of short duration when the output of the primary source falls below a predetermined value.

2. In a device as set forth in claim 1, said primary source comprising a battery and said secondary source comprising a standby battery for the primary source battery.

3. In a warning device having a power source, means for detecting a predetermined condition and thereupon emitting a signal, an amplifier having a power input connected to said source and a signal input connected to said detecting means for amplifying the signal, a trigger device connected to the amplifier to be triggered upon reception of the predetermined amplified signal, and an alarm unit connected to said trigger device to be energized when the latter is triggered, the improvement comprising, in combination with rate of change detecting means, a plurality of capacitor banks adapted to be connected selectively to the amplifier power input, and switch means for selectively adding said capacitor banks to the amplifier power input to vary the time constants and thus the detecting sensitivity of the device.

4. In a device as set forth in claim 3, said switch means comprising a plural position switch including a plurality of positions for selectively adding capacitor banks to the amplifier input and a further position for bypassing said trigger device and directly connecting said alarm unit to the power source, said switch means in its said further position in the absence of an alarm serving to test the operability of the alarm, and following an alarm serving to trip said trigger device and thereby reset the same.

5. In a device as set forth in claim 4, wherein the device includes a load unit connected to the primary source; a supervisory circuit comprising a secondary power source, a capacitor in series with said secondary source, means coupling said capacitor to one side and said secondary source to the other side of said load unit to sense the voltage drop thereacross, second trigger means responsive upon charging of said capacitor for connecting said alarm unit in series with said secondary source, said capacitor being charged by said secondary source when the voltage drop across said load unit falls below a predetermined value and when charged triggering said second trigger means, said second trigger means during discharge of said capacitor causing said secondary source to energize said alarm unit, whereby the alarm unit emits periodic alarms of short duration when the output of the primary source falls below a predetermined value.

*6. A warning device comprising a power source, said power source comprising a battery,*

*means energized by said power source for providing first and second audible warnings, said first audible warning being sensually discernably different than said second audible warning, said providing means having an operative state in which either said first warning or said second warning is provided and an inactive state in which neither said first warning nor said second warning is provided,*

*means for detecting the presence of combustion,*

*first means responsive to said detecting means upon the detection of the presence of combustion for placing said providing means in its operative state and for causing said providing means to provide said first warning,*

*means for establishing a first voltage representative of the output voltage of said battery,*

*means for monitoring said first voltage, said monitoring means including means for establishing a reference voltage and means for comparing said first voltage to said reference voltage, said establishing means comprising a diode, and*

*second means responsive to said comparing means for placing said providing means in its operative state and for causing said providing means to provide said second warning when said first voltage differs from said reference voltage by a predetermined amount.*

*7. A warning device as defined in claim 6 further comprising means for interrupting said first warning.*

*8. A warning device as defined in claim 7 wherein said interrupting means comprises manually manipulative means for resetting said first means to interrupt the placing of said providing means in its operative state by said first means.*

*9. A warning device as defined in claim 6 wherein said battery comprises a 10.7 volt battery.*

*10. A warning device as defined in claim 6 wherein said first warning comprises a substantially constant signal.*

*11. A warning device comprising a power source, said power source comprising a battery,*

*means energized by said power source for providing first and second audible warnings, said first audible warning comprising a substantially constant signal and said second audible warning comprising a periodic signal, said providing means having an operative state in which either said first warning or said*

*second warning is provided and an inactive state in which neither said first warning nor said second warning is provided,*

*means for detecting the presence of combustion,*

*first means responsive to said detecting means upon the detection of the presence of combustion for placing said providing means in its operative state and for causing said providing means to provide said first warning,*

*means for monitoring the output voltage of said battery, said monitoring means including means for establishing a reference voltage and means for comparing at least a portion of said output voltage to said reference voltage, and*

*second means responsive to said comparing means for placing said providing means in its operative state and for causing said providing means to provide said second warning when said portion of said output voltage differs from said reference voltage by a predetermined amount.*

*12. A warning device as defined in claim 11 wherein said periodic signal comprises a signal that is alternately audible for a first time period and substantially inaudible for a second time period, said first time period being substantially less than said second time period.*

*13. A warning device as defined in claim 12 wherein said providing means comprises a single audible horn for providing both said first and second audible warnings.*

*14. A warning device comprising a power source, said power source comprising a battery,*

*means energized by said power source for providing first and second audible warnings, said providing means having an operative state in which either said first warning or said second warning is provided and an inactive state in which neither said first warning nor said second warning is provided,*

*means for detecting the presence of combustion,*

*first means responsive to said detecting means upon the detection of the presence of combustion for placing said providing means in its operative state and for causing said providing means to provide said first warning,*

*means for monitoring the output voltage of said battery, said monitoring means including means for establishing a reference voltage and means for comparing at least a portion of said output voltage to said reference voltage, said establishing means comprising a zener diode, and*

*second means responsive to said comparing means for placing said providing means in its operative state and for causing said providing means to provide said second warning when said portion of said output voltage differs from said reference voltage by a predetermined amount.*

*15. A warning device as defined in claim 14 wherein said comparing means comprises a unijunction transistor for comparing said portion of said output voltage to said reference voltage.*

*16. A warning device as defined in claim 15 wherein said unijunction transistor includes a first terminal electrically connected through first series resistive means to the anode of said zener diode, the cathode of said zener diode being directly electrically connected to a first output terminal of said power source.*

*17. A warning device as defined in claim 16 wherein said unijunction transistor includes a second terminal electrically connected through a path including second series resistive means to a second output terminal of said power source.*

*18. A warning device comprising*

*means for detecting the presence of combustion,*

*means for emitting an audible signal, said emitting means having an active state in which said audible signal is emitted and an inactive state in which said audible signal is not emitted,*

*first means responsive to said detecting means upon the detection of the presence of combustion for placing said emitting means in said active state and for maintaining said emitting means in said active state and*

*second means for placing said emitting means in said active state and for maintaining said emitting means in said active state and for simultaneously resetting said first means to interrupt the placing and the maintaining of said emitting means in said active state by said first means.*

*19. A warning device as defined in claim 18 wherein said second means comprises a manually manipulative means.*

*20. A warning device as defined in claim 18 further comprising a power source for energizing said emitting means, said power source comprising a battery, and means for monitoring the output voltage of said battery and third means responsive to said monitoring means for placing said emitting means in said active state when said output voltage equals a nonzero, reference value.*

*21. A warning device as defined in claim 20 wherein said monitoring means comprises means for establishing a reference voltage and means for comparing at least a portion of said output voltage to said reference voltage, said nonzero reference value being a voltage having a predetermined voltage difference between said portion of said output voltage and said reference voltage.*

*22. A warning device as defined in claim 21 wherein said power source comprises a 10.7 volt battery.*

*23. A warning device as defined in claim 21 wherein said third means comprises means for conditioning said emitting means to emit a periodic signal.*

*24. A warning device as defined in claim 23 wherein said periodic signal comprises a signal that is alternately audible for a first time period and substantially inaudible for a second time period, said first time period being substantially less than said second time period.*

*25. A warning device as defined in claim 21 wherein said establishing means comprises a zener diode.*

*26. A warning device as defined in claim 25 wherein said comparing means comprises a unijunction transistor for comparing at least said portion of said output voltage to said reference voltage.*

*27. A warning device as defined in claim 26 wherein said unijunction transistor includes a first terminal electrically connected through first series resistive means to the anode of said zener diode, the cathode of said zener diode being directly electrically connected to a first output terminal of said power source.*

*28. A warning device as defined in claim 27 wherein said unijunction transistor includes a second terminal electrically connected through a path including second series resistive means to a second output terminal of said power source.*

*29. A warning device as defined in claim 28 wherein said battery includes two output terminals and wherein said first output terminal comprises the more electrically positive one of said two output terminals of said battery and wherein said second output terminal comprises the*

*more electrically negative one of said two output terminals of said battery.*

*30. A warning device comprising*

*a power source, said power source comprising a battery,*

*means for emitting an audible signal, said emitting means having an active state in which said audible signal is emitted and an inactive state in which said audible signal is not emitted,*

*means for detecting the presence of combustion,*

*first means responsive to said detecting means for placing said emitting means in said active state and for maintaining said emitting means in said active state,*

*means for monitoring the output voltage of said battery and*

*second means responsive to said monitoring means for placing said emitting means in said active state when said output voltage equals a nonzero, reference value, said second means including means for conditioning said emitting means to emit a periodic signal.*

*31. A warning device as defined in claim 30 further comprising means for resetting said first means to interrupt the placing and the maintaining of said emitting means in said active state by said first means.*

*32. A warning device as defined in claim 31 wherein said resetting means comprises manually manipulative means.*

*33. A warning device as defined in claim 30 wherein said monitoring means comprises means for establishing a reference voltage.*

*34. A warning device as defined in claim 33 wherein said monitoring means further comprises means for comparing said output voltage to said reference voltage.*

*35. A warning device as defined in claim 34 wherein said battery comprises a 10.7 volt battery.*

*36. A warning device as defined in claim 34 wherein said periodic signal comprises a signal that is alternately audible for a first time period and substantially inaudible for a second time period, said first time period being substantially less than said second time period.*

*37. A warning device as defined in claim 34 wherein said establishing means comprises a zener diode.*

*38. A warning device as defined in claim 37 wherein said comparing means comprises a unijunction transistor for comparing said output voltage to said reference voltage.*

*39. A warning device as defined in claim 37 wherein said unijunction transistor includes a first terminal electrically connected through series resistive means to the anode of said zener diode, the cathode of said zener diode being directly electrically connected to a first output terminal of said power source.*

*40. A warning device as defined in claim 39 wherein said unijunction transistor includes a second terminal electrically connected through a path including second series resistive means to a second output terminal of said power source.*

* * * * *